US012659433B2

(12) United States Patent
Chen

(10) Patent No.: US 12,659,433 B2
(45) Date of Patent: Jun. 16, 2026

(54) LENS MODULE AND PROJECTION DEVICE

(71) Applicant: Coretronic Corporation, Hsin-Chu (TW)

(72) Inventor: Yi-Chang Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 659 days.

(21) Appl. No.: 18/186,195

(22) Filed: Mar. 20, 2023

(65) Prior Publication Data

US 2023/0300303 A1     Sep. 21, 2023

(30) Foreign Application Priority Data

Mar. 21, 2022     (CN) .......................... 202210275418.8

(51) Int. Cl.
*H04N 9/31*           (2006.01)
*G03B 21/14*          (2006.01)

(52) U.S. Cl.
CPC ........... *H04N 9/317* (2013.01); *G03B 21/142* (2013.01); *H04N 9/3197* (2013.01)

(58) Field of Classification Search
CPC .................. G03B 21/00–64; H04N 9/31–3197
See application file for complete search history.

(56) References Cited

U.S. PATENT DOCUMENTS

2018/0088449 A1* 3/2018 Hatano ................ G03B 21/147

FOREIGN PATENT DOCUMENTS

| CN | 105022133 | 11/2015 |
| TW | 200842482 | 11/2008 |

* cited by examiner

*Primary Examiner* — Christopher A Lamb, II
(74) *Attorney, Agent, or Firm* — JCIPRNET

(57) ABSTRACT

A lens module includes a fixing seat, a moving assembly, a lens unit, a first sliding member, a first knob, and a first fixing member. The fixing seat has a first guide slot extended along a first axis. The moving assembly is disposed on the fixing seat and includes a first inclined surface. The lens unit is fixed to the moving assembly. The first sliding member is movably disposed on the fixing seat along a second axis and connected to the moving assembly, and the first sliding member includes a second inclined surface. The first knob is disposed on the fixing seat and connected to the first sliding member, and the first knob is configured to drive the first sliding member to move relative to the fixing seat. The first fixing member passes through the moving assembly and the first guide slot and is fixed on the fixing seat.

26 Claims, 9 Drawing Sheets

LENS MODULE AND PROJECTION DEVICE

CROSS-REFERENCE TO RELATED APPLICATION

This application claims the priority benefit of China application serial no. 202210275418.8, filed on Mar. 21, 2022. The entirety of the above-mentioned patent application is hereby incorporated by reference herein and made a part of this specification.

BACKGROUND OF THE INVENTION

Field of the Invention

The invention relates to a lens module and a projection device, and more particularly, to a position-adjustable lens module and a projection device having the lens module.

Description of Related Art

In order to provide a projection device with better projection effect, how to adjust the position of the lens of the projection device so that the lens and the light valve are well aligned is a research goal in the art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projection device and a lens module, wherein a lens unit of the lens module is movable, so as to facilitate good alignment of the lens unit and a light valve.

Other objects and advantages of the invention may be further understood from the technical features disclosed in the invention.

In order to achieve one or part or all of the above objects or other objects, an embodiment of the invention provides a lens module including a fixing seat, a moving assembly, a lens unit, a first sliding member, a first knob, and a first fixing member. The fixing seat has a side surface, and the side surface is provided with a first guide slot extended along a first axis. The moving assembly is disposed on the side surface of the fixing seat, and the moving assembly includes a first inclined surface. The lens unit is fixed to the moving assembly. The first sliding member is movably disposed on the side surface of the fixing seat along a second axis and connected to the moving assembly, and the first sliding member includes a second inclined surface adjacent to the first inclined surface. The first knob is disposed on the fixing seat and connected to the first sliding member, and the first knob is configured to drive the first sliding member to move relative to the fixing seat. The first fixing member passes through the moving assembly and the first guide slot and is fixed on the fixing seat. When the first knob is rotated, the first sliding member is driven to move along the second axis, and the second inclined surface pushes against the first inclined surface, so that the moving assembly, together with the lens unit, is moved relative to the fixing seat along the first axis.

An embodiment of the invention also provides a projection device including a light source, a light valve, and a lens module. The light source is configured to provide an illumination beam. The light valve is disposed on a transmission path of the illumination beam and configured to convert the illumination beam into an image beam. The lens module is disposed on a transmission path of the image beam and configured to project the image beam out of the projection device. The lens module includes a fixing seat, a moving assembly, a lens unit, a first sliding member, a first knob, and a first fixing member. The fixing seat has a side surface, and the side surface is provided with a first guide slot extended along a first axis. The moving assembly is disposed on the side surface of the fixing seat, and the moving assembly includes a first inclined surface. The lens unit is fixed to the moving assembly. The first sliding member is movably disposed on the side surface of the fixing seat along a second axis and connected to the moving assembly, and the first sliding member includes a second inclined surface adjacent to the first inclined surface. The first knob is disposed on the fixing seat and connected to the first sliding member, and the first knob is configured to drive the first sliding member to move relative to the fixing seat. The first fixing member passes through the moving assembly and the first guide slot and is fixed on the fixing seat. When the first knob is rotated, the first sliding member is driven to move along the second axis, and the second inclined surface pushes against the first inclined surface, so that the moving assembly, together with the lens unit, is moved relative to the fixing seat along the first axis.

In an embodiment of the invention, the moving assembly includes a moving body and a second sliding member connected to the moving body, the second sliding member includes a groove, at least a portion of the first sliding member is located in the groove, and the first inclined surface of the groove is adjacent to the second inclined surface of the first sliding member.

In an embodiment of the invention, the moving body includes a first chute extended along the second axis, a sliding portion of the second sliding member is located in the first chute, and the sliding portion is adapted to move along the second axis in the first chute.

In an embodiment of the invention, the lens module further includes an elastic member, the first fixing member includes a cap portion, a threaded portion, and a connecting portion located between the cap portion and the threaded portion, the moving assembly includes a moving body, the moving body includes a first elongated hole extended along the second axis, the connecting portion is located in the first elongated hole, and the elastic member is disposed between the cap portion and the moving body.

In an embodiment of the invention, the lens module further includes a washer disposed between the elastic member and the moving body.

In an embodiment of the invention, the lens module further includes a first limiting member disposed on the fixing seat and including a first recess hole, and the first knob includes a first handle portion, a first stud, and a first disc located between the first handle portion and the first stud, wherein on a plane perpendicular to the second axis, an area of the first recess hole is greater than a cross-sectional area of the first stud and smaller than an area of the first disc, and the first disc is restricted by the first limiting member from moving on the second axis.

In an embodiment of the invention, the first sliding member includes a first screw hole extended along the second axis, and the first stud of the first knob is screwed to the first screw hole.

In an embodiment of the invention, the lens module further includes a second fixing member, the first sliding member further includes a second elongated hole extended along the second axis, and the second fixing member passes through the second elongated hole and is fixed on the side surface of the fixing seat.

In an embodiment of the invention, the lens module further includes a second knob and a third sliding member linked to the second knob, the second knob is disposed on the fixing seat, the moving assembly includes a moving body, the moving body includes a second chute extended along the first axis, the third sliding member is located in the second chute, and when the second knob is rotated, the third sliding member, together with the moving body and the lens unit, is driven to move relative to the fixing seat along the second axis.

In an embodiment of the invention, the first knob and second knob are disposed on the fixing seat in parallel along the second axis.

In an embodiment of the invention, the lens module further includes a second limiting member disposed on the fixing seat and including a second recess hole, and the second knob includes a second handle portion, a second stud, and a second disc located between the second handle portion and the second stud, wherein on a plane perpendicular to the second axis, an area of the second recess hole is greater than a cross-sectional area of the second stud and smaller than an area of the second disc, and the second disc is restricted by the second limiting member from moving on the second axis.

In an embodiment of the invention, the third sliding member includes a second screw hole extended along the second axis, and the second stud of the second knob is screwed to the second screw hole.

In an embodiment of the invention, the lens module further includes a protruding member located between the side surface of the fixing seat and the moving assembly, and a protruding surface of the protruding member has an arc.

Based on the above, in the lens module of the projection device of the invention, the lens unit is fixed to the moving assembly, the moving assembly and the first sliding member are movably disposed on the side of the fixing seat, and the second inclined surface of the first sliding member is adjacent to the first inclined surface of the first sliding member. The side surface of the fixing seat is provided with the first guide slot extended along the first axis, and the first fixing member passes through the moving assembly and the first guide slot and is fixed on the fixing seat. The first knob is configured to drive the first sliding member to move relative to the fixing seat. When the first knob is rotated, the first sliding member is driven to move along the second axis, and the second inclined surface pushes against the first inclined surface, so that the moving assembly, together with the lens unit, is moved relative to the fixing seat along the first axis. Therefore, the position of the lens unit of the lens module may be adjusted to improve the quality of the image projected by the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
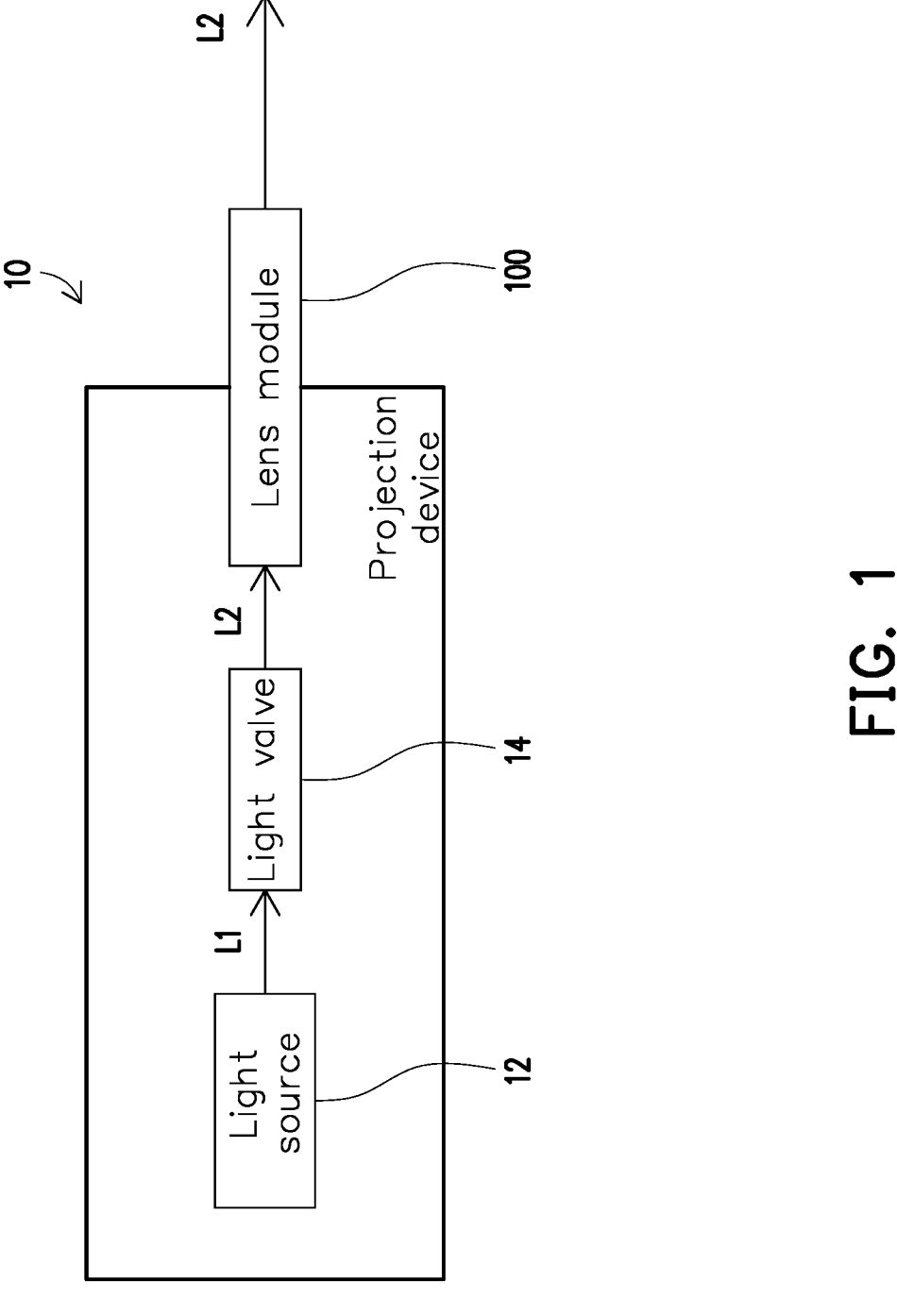
FIG. 1 is a schematic diagram of a projection device of an embodiment of the invention.

FIG. 1 is a schematic diagram of a projection device of an embodiment of the invention. Please refer to FIG. 1, a projection device 10 of the present embodiment includes a light source 12, a light valve 14, and a lens module 100. The light source 12 is configured to provide an illumination beam L1. The light source 12 includes a light-emitting element (not shown), wherein the light-emitting element is, for example, a metal halide lamp, a high-pressure mercury lamp, or a solid-state light source. The solid-state light source is, for example, a light-emitting diode (LED) or a laser diode (LD) or the like.

The light valve 14 is disposed on the transmission path of the illumination beam L1 from the light source 12 and configured to convert the illumination beam L1 into an image beam L2. The light valve 14 is, for example, a reflective light modulator such as a liquid-crystal-on-silicon panel (LCoS panel) or a digital micro-mirror device (DMD). In some embodiments, the light valve 14 may also be a transmissive light modulator such as a transparent liquid-crystal panel, an electro-optical modulator, a magneto-optic modulator, or an acousto-optic modulator (AOM).

The lens module 100 is disposed on the transmission path of the image beam L2 from the light valve 14 and configured to project the image beam L2 out of the projection device 10 and form a projection image on a projection target (not shown). The projection target is, for example, a screen, a wall surface, or a table surface. The lens module 100 includes a lens unit 140 (only shown in dotted lines in FIG. 2), and the lens unit 140 includes, for example, a combination of one or a plurality of optical lenses with diopter, and includes, for example, various combinations of non-planar lenses such as a biconcave lens, a lenticular lens, a meniscus lens, a convex and concave lens, a plano-convex lens, or a plano-concave lens. In some embodiments, the lens module 100 may also include a flat mirror or a curved mirror to project the image beam L2 from the light valve 14 to the projection target in a reflective manner.

The lens module 100 of the present embodiment has a special design, and the position of the lens module 100 may be adjusted conveniently and simply so as to be well aligned with the light valve 14, thereby effectively improving projection quality. Description is provided below.

Figure 2:
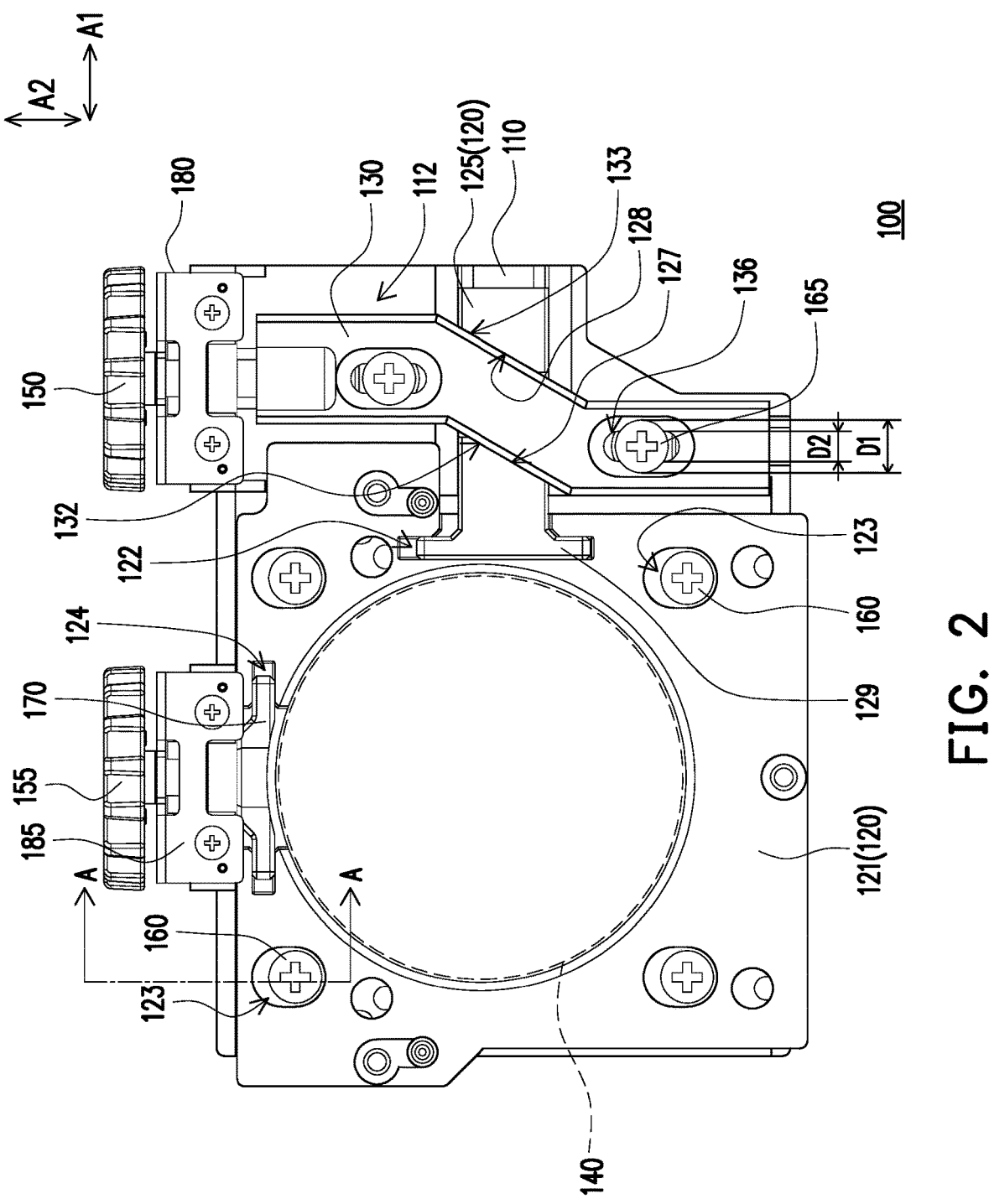
FIG. 2 and FIG. 3 are schematic diagrams of various viewing angles of the lens module of the projection device of FIG. 1.
Figure 3:
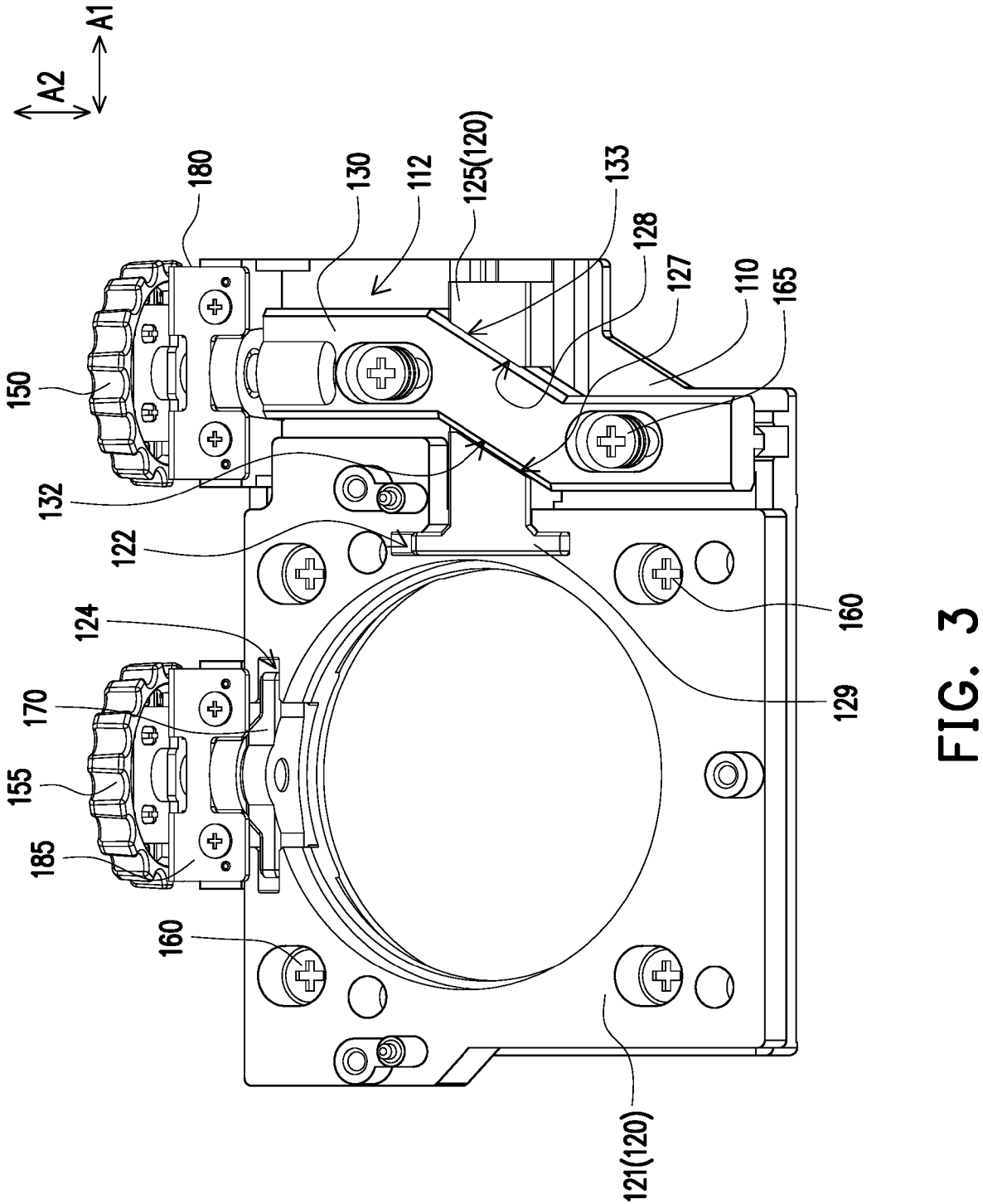
Figure 4:
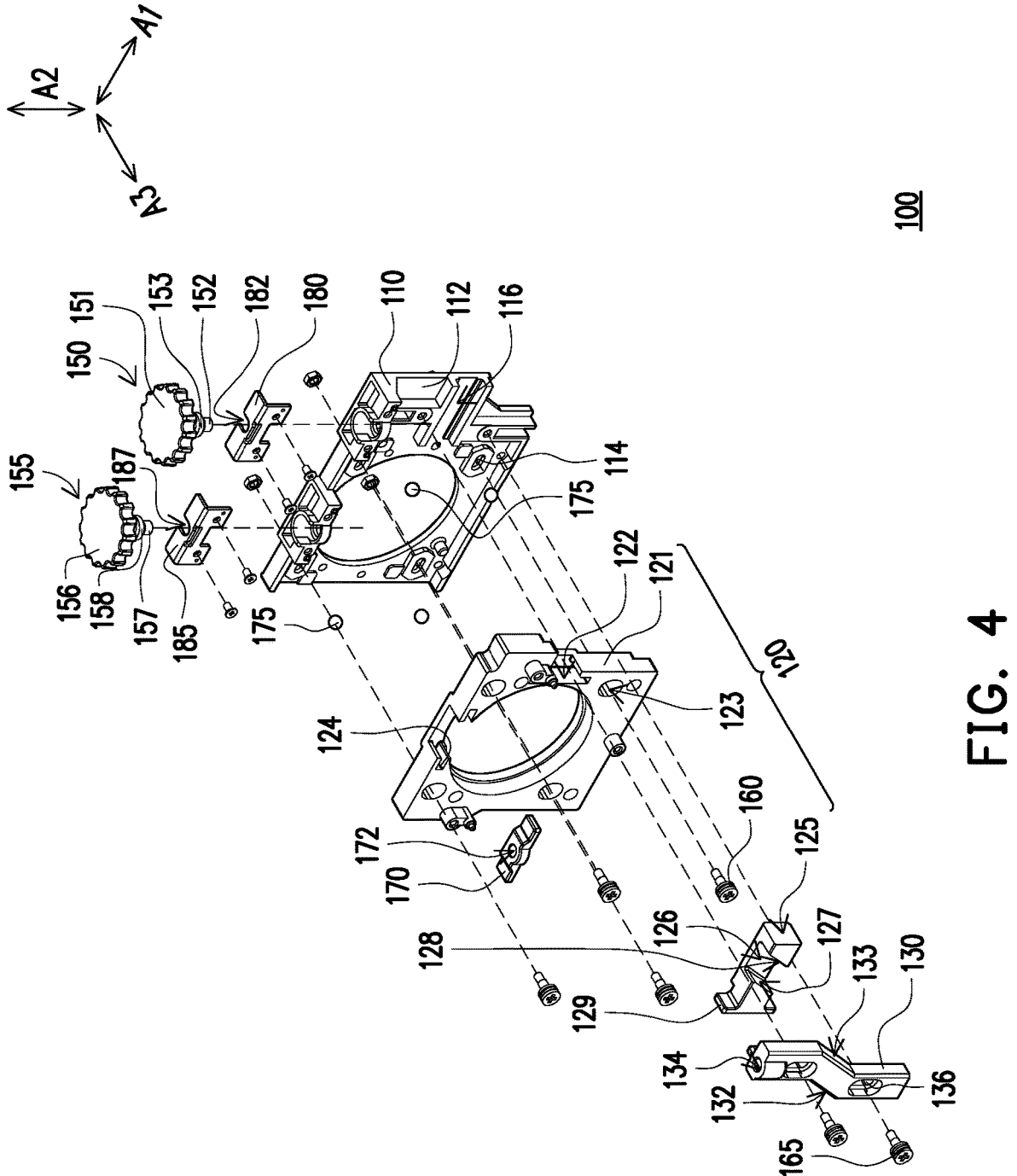
FIG. 4 is an exploded schematic diagram of the lens module of FIG. 2.

FIG. 2 and FIG. 3 are schematic diagrams of various viewing angles of the lens module of the projection device of FIG. 1. FIG. 4 is an exploded schematic diagram of the lens module of FIG. 2. Referring to FIG. 2 to FIG. 4, in the present embodiment, the lens module 100 includes a fixing seat 110, a moving assembly 120, a first sliding member 130, a first knob 150, and a first fixing member 160.

In the present embodiment, the fixing seat 110 is, for example, a part of the housing of the optical machine of the projection device 10 (shown in FIG. 1), and the light source 12 (shown in FIG. 1) and the light valve 14 (shown in FIG. 1) may be disposed in the housing of the optical machine, for example, but the invention is not limited thereto. As shown in FIG. 4, the fixing seat 110 has a side surface 112, and the side surface 112 has a first guide slot 114 and a mounting groove 116 extended along the first axis A1.

The moving assembly 120 is disposed on the side surface 112 of the fixing seat 110. In the present embodiment, the moving assembly 120 includes a moving body 121. The lens unit 140 is fixed to the moving body 121 of the moving assembly 120, and the moving body 121 is configured to drive the lens unit 140 to move synchronously. Specifically, the moving body 121 is, for example, a movably disposed plate, and the moving body 121 has a slot hole (not shown in the figure) configured for placing the lens unit 140. In the present embodiment, the image beam L2 (shown in FIG. 1) is transmitted from the light valve 14 (shown in FIG. 1) out of the lens unit 140 of the lens module 100 along a third axis A3, and the optical axis of the lens unit 140 is parallel to the third axis A3 and perpendicular to the first axis A1 and the second axis A2, respectively.

In the present embodiment, the moving body 121 includes a first elongated hole 123 extended along the second axis A2. As shown in FIG. 4, the first fixing member 160 passes through the first elongated hole 123 of the moving body 121 and the first guide slot 114 of the fixing seat 110 along the third axis A3, so that the moving body 121 is movably disposed on the side surface 112 of the fixing seat 110.

Figure 5:
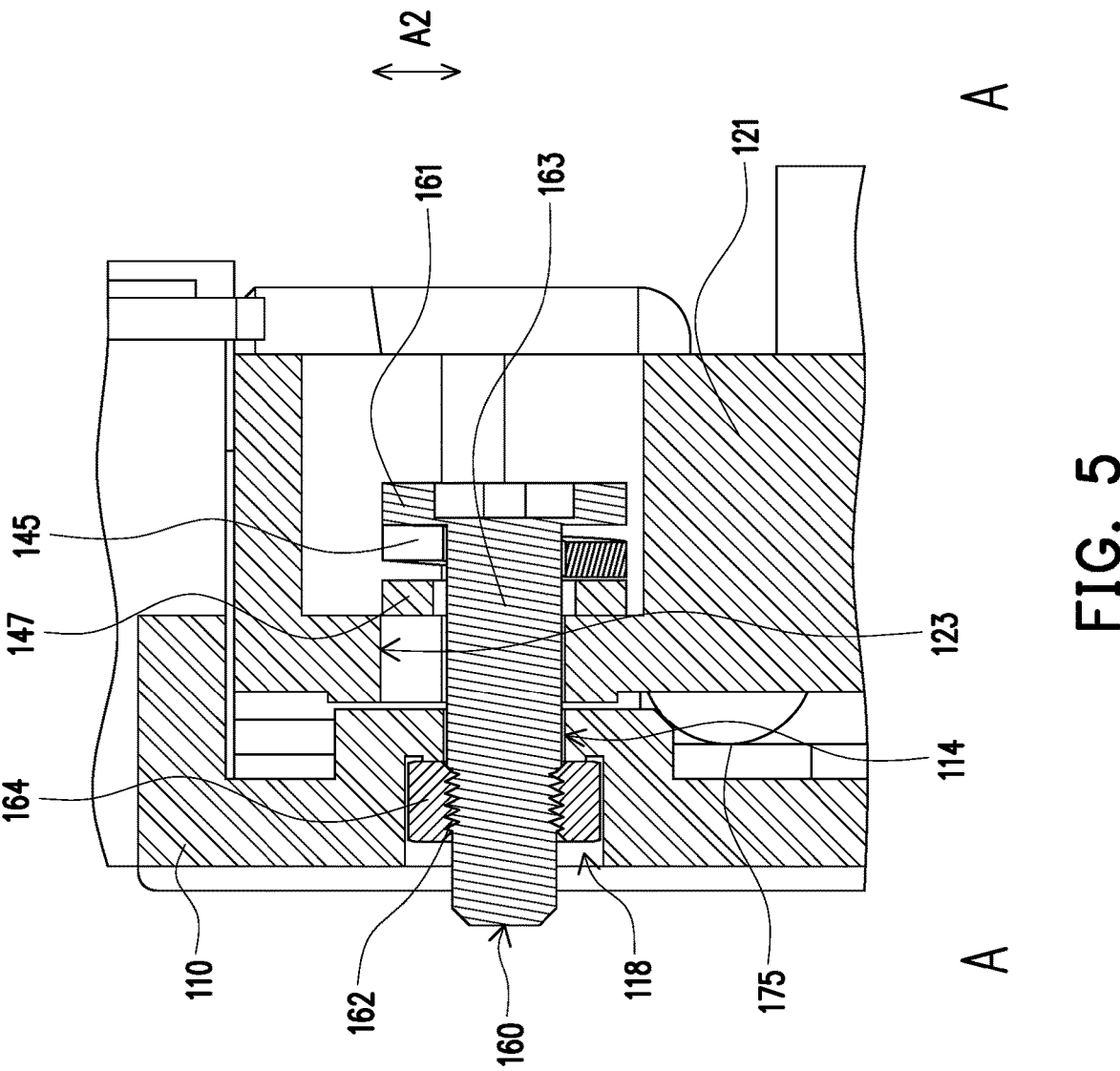
FIG. 5 is a schematic cross-sectional view along the A-A line segment of the lens module of FIG. 2.

Specifically, FIG. 5 is a schematic cross-sectional view along the A-A line segment of the lens module of FIG. 2. Referring to FIG. 5, the first fixing member 160 is, for example, a step screw. The first fixing member 160 includes a cap portion 161, a threaded portion 162, and a connecting portion 163 located between the cap portion 161 and the threaded portion 162. The connecting portion 163 passes through the first elongated hole 123 of the moving body 121 and the first guide slot 114 of the fixing seat 110. The first guide slot 114 is configured to restrict the connecting portion 163 to move only along the first axis A1 and not move on the second axis A2. The lens module 100 further includes a nut 164, and the nut 164 corresponds to the first fixing member 160. Specifically, the threaded portion 162 of the first fixing member 160 is screwed to the nut 164. The fixing seat 110 further includes a limiting groove 118 extended along the first axis A1, the limiting groove 118 communicates with the corresponding first guide slot 114, and the nut 164 is disposed in the limiting groove 118. The limiting groove 118 is configured to limit the nut 164 to move only along the first axis A1 and not move on the second axis A2, and the nut 164 is abutted against the bottom surface of the limiting groove 118 to limit the movement of the nut 164 and the first fixing member 160 on the third axis A3. On a reference plane perpendicular to the third axis A3 (shown in FIG. 4), the orthographic projection of the first guide slot 114 on the reference plane is overlapped with the orthographic projection of the limiting groove 118 on the reference plane. More specifically, the area of the connecting portion 163 of the first fixing member 160 on the reference plane is smaller than the area of the nut 164 on the reference plane. Therefore, the area of the first guide slot 114 on the reference plane is smaller than the area of the limiting groove 118 on the reference plane.

Referring to FIG. 2, the first elongated hole 123 of the moving body 121 has a long axis (not shown) along the second axis A2 and a short axis (not shown) along the first axis A1. Since the short axis of the first elongated hole 123 is slightly greater than or equal to the diameter (not shown) of the cap portion 161 of the first fixing member 160, the short axis of the first elongated hole 123 of the moving body 121 restricts the first fixing member 160 from moving in the first elongated hole 123 along the first axis A1. In the present embodiment, since the first fixing member 160 is moved along the first axis A1 in the first guide slot 114 of the fixing seat 110, the first fixing member 160 may drive the moving body 121 and the lens unit 140 to move along the first axis A1. Moreover, since the long axis of the first elongated hole 123 is greater than the diameter of the cap portion 161 of the first fixing member 160, and the first guide slot 114 of the fixing seat 110 restricts the first fixing member 160 from moving on the second axis A2, via the first fixing member 160 passing through the first elongated hole 123 of the moving body 121 and the first guide slot 114 of the fixing seat 110, the moving body 121 and the lens unit 140 are moved up and down along the second axis A2 relative to the fixing seat 110.

Please refer to FIG. 4 and FIG. 5, in the present embodiment, the lens module 100 further includes an elastic member 145 disposed between the cap portion 161 of the first fixing member 160 and the moving body 121. The elastic member 145 is configured for abutting the moving body 121 along the third axis A3 in the direction of the fixing seat 110. The elastic member 145 is, for example, a spring. In the present embodiment, the lens module 100 further includes a washer 147 disposed between the elastic member 145 and the moving body 121. That is, two opposite ends of the elastic member 145 are abutted against the cap portion 161 of the first fixing member 160 and the washer 147 respectively. The washer 147 is configured to improve the smoothness of the sliding of the first fixing member 160 relative to the moving body 121 on the second axis A2. In addition, the washer 147 includes a flat surface configured to support the elastic member 145 to prevent the elastic member 145 from falling into the first elongated hole 123 of the moving body 121. The material of the washer 147 may be a metal or a non-metal material, and the invention is not limited thereto.

In addition, the lens module 100 further includes a protruding member 175, and the protruding surface of the protruding member 175 has an arc. The external appearance of the protruding member 175 may be, for example, a spherical shape, and the material of the protruding member 175 may be a metal or a non-metallic material. In the present embodiment, the protruding member 175 is, for example, a steel ball, but the type of the protruding member 175 is not limited thereto. The protruding member 175 is located between the side surface 112 of the fixing seat 110 and the moving body 121 of the moving assembly 120, and may improve the sliding smoothness of the moving assembly 120 relative to the side surface 112 of the fixing seat 110.

Returning to FIG. 2, the moving assembly 120 further includes a second sliding member 125 connected to the moving body 121. The moving body 121 includes a first chute 122 extended along the second axis A2. A portion of the second sliding member 125 is a sliding portion 129. The sliding portion 129 of the second sliding member 125 is adapted to move along the second axis A2 in the first chute 122 of the moving body 121.

It should be mentioned that, in the present embodiment, since on the first axis A1, the second sliding member 125 is engaged with the first chute 122, and the outer edge of the sliding portion 129 of the second sliding member 125 is rested against the inner wall of the first chute 122, the second sliding member 125 and the moving body 121 are moved synchronously on the first axis A1 without relative movement.

Moreover, another portion (the right half) of the second sliding member 125 except the sliding portion 129 is extended from the first chute 122 of the moving body 121 and slidably disposed at the mounting groove 116 on the side surface 112 of the fixing seat 110. The mounting groove 116 is extended along the first axis A1. Therefore, the second sliding member 125 and the moving body 121 may be moved together on the first axis A1 relative to the fixing seat 110.

In the present embodiment, the first sliding member 130 of the lens module 100 is movably disposed on the side surface 112 of the fixing seat 110 along the second axis A2 and connected to the second sliding member 125 of the moving assembly 120. As shown in FIG. 4, the moving assembly 120 includes a first inclined surface 127. The first sliding member 130 includes a second inclined surface 132. The first sliding member 130 includes a second inclined surface 132. The first sliding member 130 includes a groove 126, and at least a portion of the first sliding member 130 is located in the groove 126. The first inclined surface 127 of the moving assembly 120 is a wall surface of the groove 126 of the second sliding member 125, the first inclined surface 127 is neither perpendicular to the first axis A1 nor perpendicular to the first axis A2, and the first inclined surface 127 is adjacent to the second inclined surface 132 of the first sliding member 130. The first sliding member 130 further includes a fourth inclined surface 133 opposite to the second inclined surface 132. The third inclined surface 128 of the moving assembly 120 is another wall surface of the groove 126 of the second sliding member 125, and the third inclined surface 128 is adjacent to the fourth inclined surface 133.

Moreover, in the present embodiment, the first inclined surface 127 is parallel to the third inclined surface 128, and the openings at two sides of the groove 126 are parallel to the first axis A1, so that the groove 126 presents a parallelogram on a reference plane perpendicular to the third axis A3. In a preferred embodiment, the included angles between the first inclined surface 127, the second inclined surface 132, the third inclined surface 128, and the fourth inclined surface 133 and a reference plane perpendicular to the second axis A2 are between 0 degrees and 90 degrees. In other embodiments, the shape of the groove 126 may be other polygonal shapes, and may be adjusted according to actual use requirements, and the invention is not limited thereto.

In the present embodiment, the lens module 100 further includes a second fixing member 165, the first sliding member 130 further includes a second elongated hole 136 extended along the second axis A2, and the second fixing member 165 passes through the second elongated hole 136 and is fixed on the side surface 112 of the fixing seat 110. The second elongated hole 136 is configured to enable the first sliding member 130 to only slide relative to the fixing seat 110 on the second axis A2 and not move on the first axis A1.

Returning to FIG. 2, in the present embodiment, a width D1 of the second fixing member 165 is greater than a width D2 of the second elongated hole 136 on the first axis A1. Therefore, the second elongated hole 136 may limit the position of the second fixing member 165 to prevent the first sliding member 130 from falling off in the direction of the third axis A3. The second fixing member 165 is, for example, a screw.

Moreover, the first knob 150 of the lens module 100 is disposed on the fixing seat 110 and connected to the first sliding member 130, and the first knob 150 is configured to drive the first sliding member 130 to move relative to the fixing seat 110. Specifically, as shown in FIG. 4, in the present embodiment, the lens module 100 further includes a first limiting member 180 disposed on the fixing seat 110, and the first limiting member 180 includes a first concave hole 182. The first knob 150 includes a first handle portion 151, a first stud 152, and a first disc 153 located between the first handle portion 151 and the first stud 152.

In the present embodiment, on a plane perpendicular to the second axis A2, the area of the first concave hole 182 is greater than the cross-sectional area of the first stud 152 of the first knob 150 and smaller than the area of the first disc 153. Therefore, the first stud 152 may be extended into the first concave hole 182, but the first disc 153 is blocked by the wall surface of the first limiting member 180 near the first concave hole 182, and does not move on the second axis A2. In other words, the first knob 150 is restricted by the first limiting member 180 and does not move on the second axis A2.

In addition, the first sliding member 130 includes a first screw hole 134 extended along the second axis A2, and the first stud 152 of the first knob 150 is screwed to the first screw hole 134. When the first knob 150 is rotated, since the first knob 150 is only rotated around the second axis A2 and does not move along the second axis A2, and the first screw hole 134 of the first sliding member 130 is moved on the second axis A2 with the rotation of the first knob 150, the first sliding member 130 is driven by the first knob 150 to move on the second axis A2.

Figure 6:
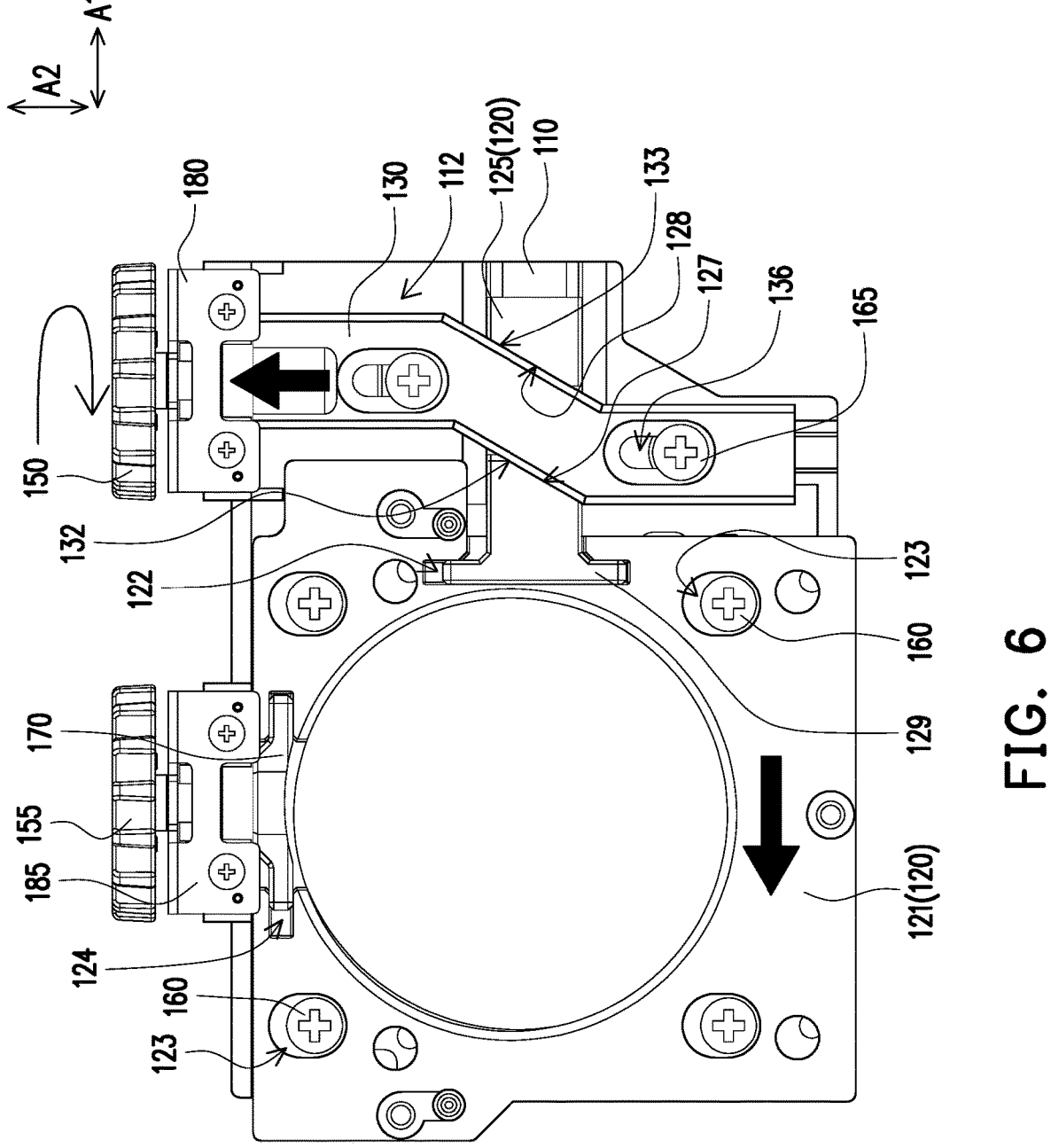
FIG. 6 to FIG. 9 are schematic diagrams of moving the moving assembly of the lens module of FIG. 2 in a plurality of directions relative to the fixing seat.

FIG. 6 to FIG. 9 are schematic diagrams of moving the moving assembly of the lens module of FIG. 2 in a plurality of directions relative to the fixing seat. In particular, the solid arrows of FIG. 6 to FIG. 9 indicate the direction of rotation or movement of the elements. Referring first to FIG. 6, when the first knob 150 is rotated forward (clockwise), the first sliding member 130 is driven to move upward along the second axis A2 by the relative movement of the threads between the first screw hole 134 and the first stud 152, and the second inclined surface 132 of the first sliding member 130 pushes against the first inclined surface 127 of the second sliding member 125, so that the moving body 121 of the moving assembly 120, together with the lens unit 140, is moved leftward relative to the fixing seat 110 along the first axis A1.

Figure 7:
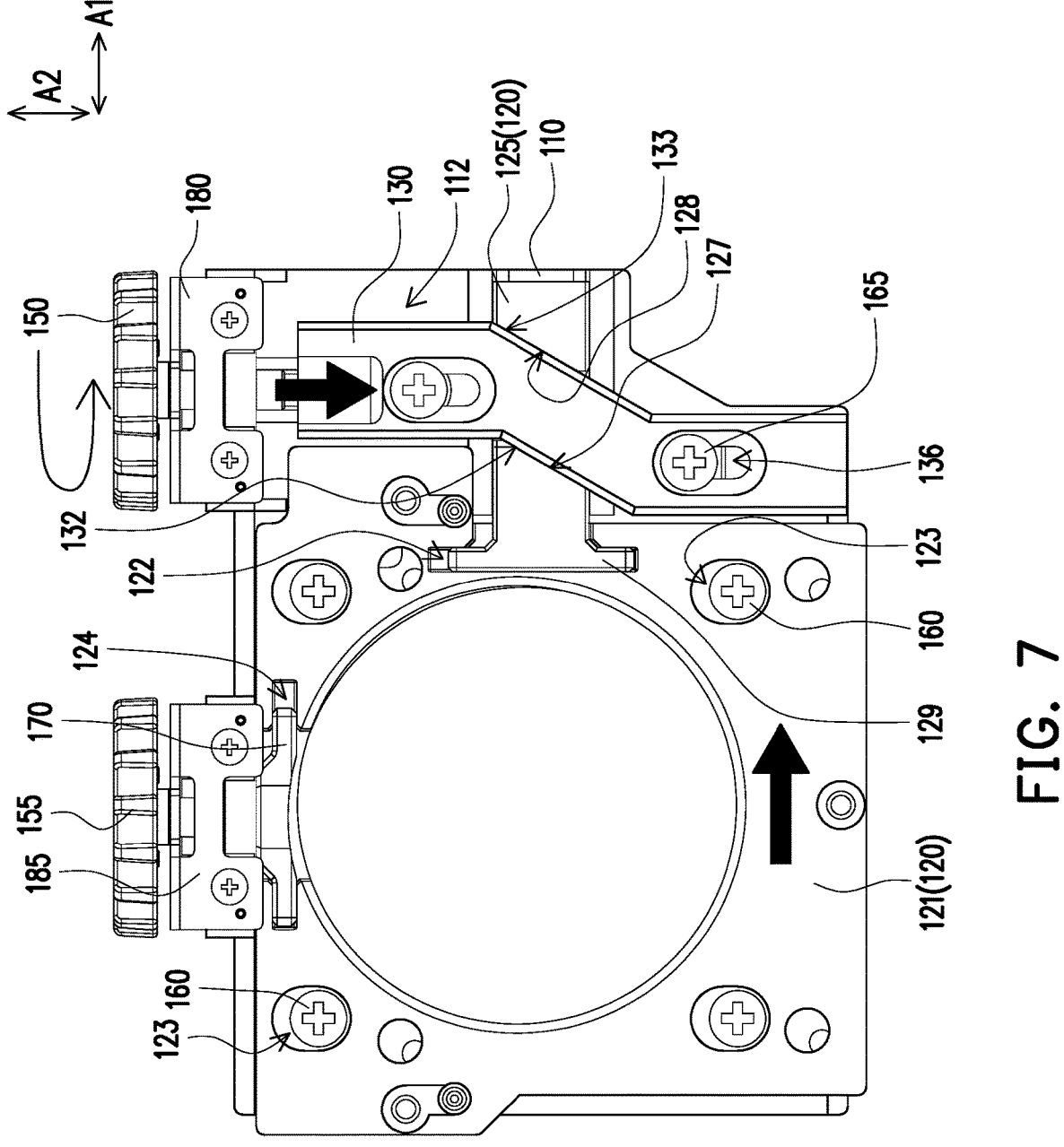

Referring to FIG. 7, when the first knob 150 is rotated backward (counterclockwise), the first sliding member 130 is driven to move downward along the second axis A2 by the relative movement of the threads between the first screw hole 134 and the first stud 152, and the fourth inclined surface 133 of the first sliding member 130 pushes against the third inclined surface 128 of the second sliding member 125, so that the moving assembly 120, together with the lens unit 140, is moved rightward relative to the fixing seat 110 along the first axis A1. In the present embodiment, the moving distance of the moving assembly 120 together with the lens unit 140 relative to the fixing seat 110 along the first axis A1 is greater than or equal to 3 mm. The moving distance may be adjusted according to the use requirements of the lens module 100, and is not limited in the invention. In addition, the rotation direction of the first knob 150 corresponding to the moving direction of the moving assembly 120 and the lens unit 140 is only for illustration, and the invention is not limited thereto.

Returning to FIG. 4, in the present embodiment, the lens module 100 further includes a second knob 155 and a third sliding member 170 linked with the second knob 155, and the second knob 155 is disposed on the fixing seat 110. In the present embodiment, the first knob 150 is configured to control the moving assembly 120 and the lens unit 140 to move along the first axis A1, and the second knob 155 is configured to control the moving assembly 120 and the lens unit 140 to move along the second axis A2. In the present embodiment, the first knob 150 and the second knob 155 are disposed on the same side of the fixing seat 110 in parallel along the second axis A2, and are located above the fixing seat 110. Such a design may facilitate the operator to adjust the first knob 150 and the second knob 155 on the same side.

Similarly, the lens module 100 further includes a second limiting member 185 disposed on the fixing seat 110, and the second limiting member 185 includes a second recess hole 187. The second knob 155 includes a second handle portion 156, a second stud 157, and a second disc 158 located between the second handle portion 156 and the second stud 157. On a plane perpendicular to the second axis A2, the area of the second concave hole 187 is greater than the cross-sectional area of the second stud 157 and smaller than the area of the second disc 158.

Therefore, the second stud 157 of the second knob 155 may be extended into the second recess hole 187 of the second limiting member 185, but the second disc 158 is blocked by the wall surface of the second limiting member 185 near the second recess hole 187 and does not move on the second axis A2. In other words, the second knob 155 is restricted by the second limiting member 185 and does not move on the second axis A2.

In addition, the moving body 121 includes a second chute 124 extended along the first axis A1, and the third sliding member 170 is located in the second chute 124. Specifically, two ends of the third sliding member 170 on the first axis A1 are movably mounted in the second chute 124, and the length of the second chute 124 on the first axis A1 is greater than the length of the third sliding member 170 on the first axis A1. Therefore, the third sliding member 170 is restricted by the second chute 124 to move along the first axis A1 in the second chute 124. Please go back to FIG. 6 to FIG. 7, when the first knob 150 is rotated forward or backward, the moving body 121 and the lens unit 140 may move leftward or rightward relative to the fixing seat 110 and the third sliding member 170 along the first axis A1 via the second chute 124. Moreover, the third sliding member 170 is restricted by the second chute 124 from moving on the second axis A2. Therefore, the third sliding member 170 and the moving body 121 are moved synchronously on the second axis A2 without relative movement.

In the present embodiment, the third sliding member 170 includes a second screw hole 172 extended along the second axis A2, and the second stud 157 of the second knob 155 passes through the second recess hole 187 of the second limiting member 185 and is then screwed to the second screw hole 172. Therefore, when the second knob 155 is rotated, since the second knob 155 is only rotated around the second axis A2 and does not move on the second axis A2, and the second screw hole 172 is moved on the second axis A2 with the rotation of the second knob 155, the third sliding member 170 is driven by the second knob 155 to move on the second axis A2.

Figure 8:
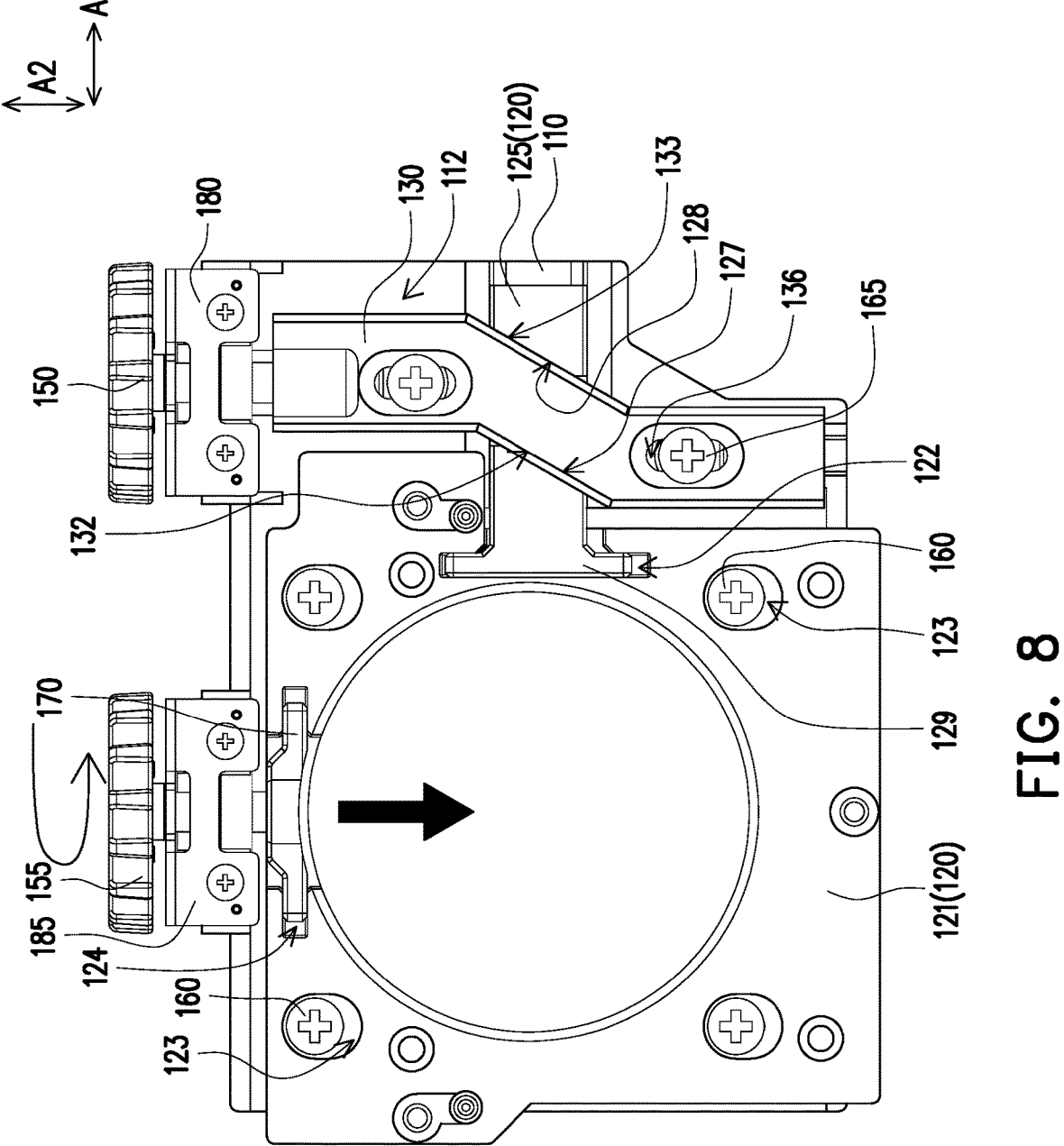

Referring to FIG. 8, when the second knob 155 is rotated backward (counterclockwise), the third sliding member 170 is moved downward relative to the fixing seat 110 along the second axis A2 via the relative action of the threads between the second screw hole 172 and the second stud 157, and the third sliding member 170 pushes the lower wall surface (not shown) of the moving body 121 in the second chute 124, so that the moving body 121 and the lens unit 140 are driven together to move downward relative to the fixing seat 110 along the second axis A2.

Figure 9:
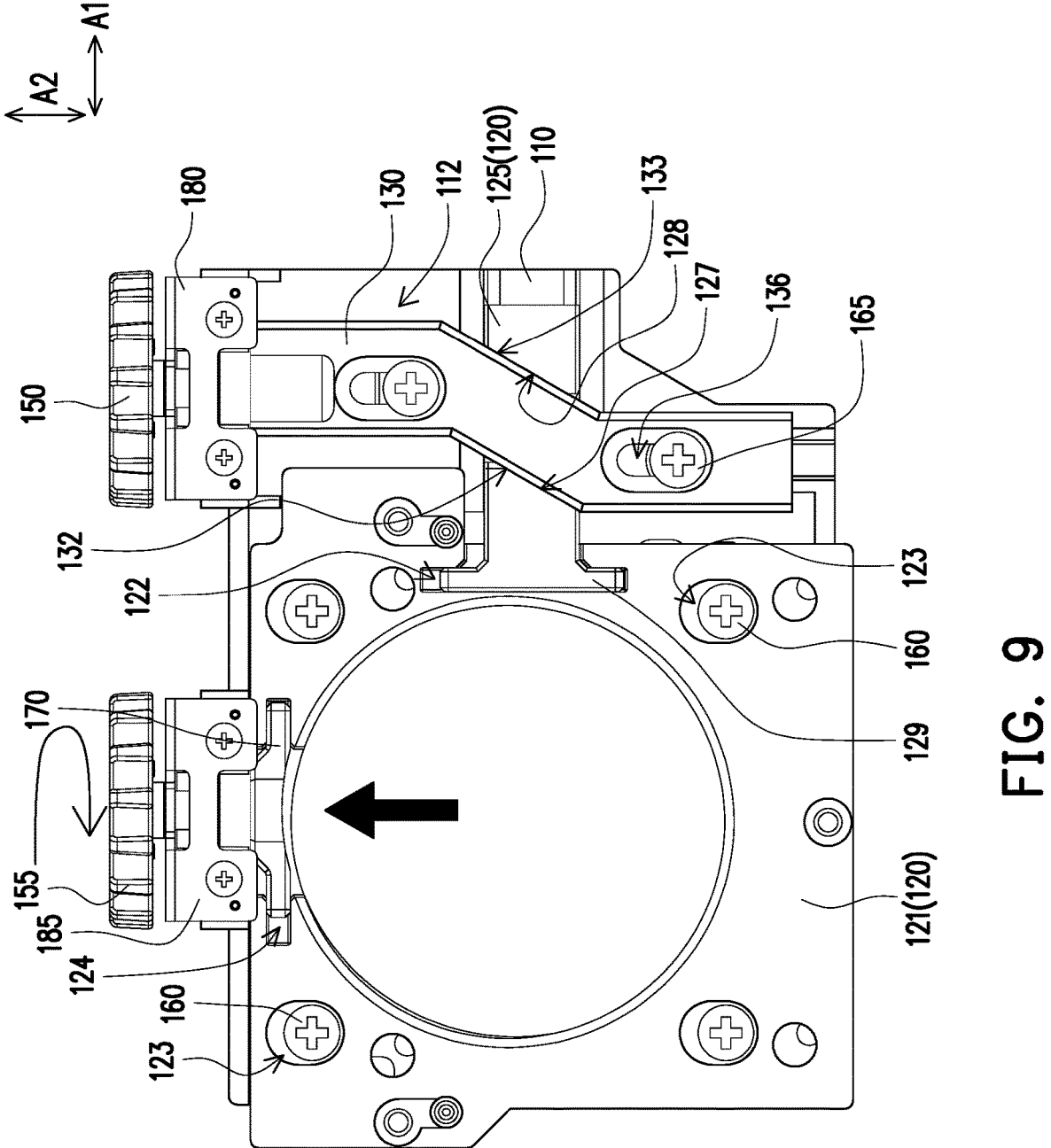

Referring to FIG. 9, when the second knob 155 is rotated forward (clockwise), the third sliding member 170 is moved upward relative to the fixing seat 110 along the second axis A2 via the relative action of the threads between the second screw hole 172 and the second stud 157, and the third sliding member 170 pushes the upper wall surface (not shown) of the moving body 121 in the second chute 124, so that the moving body 121 and the lens unit 140 are driven together to move upward relative to the fixing seat 110 along the second axis A2. In the present embodiment, the moving distance of the moving assembly 120 together with the lens unit 140 relative to the fixing seat 110 along the second axis A2 is greater than or equal to 2 mm. The moving distance may be adjusted according to the use requirements of the lens module 100, and is not limited in the invention. In addition, the rotating direction of the second knob 155 corresponding to the moving direction of the moving body 121 and the lens unit 140 is only an example for illustration, and the invention is not limited thereto. Please refer to FIG. 8 to FIG. 9 at the same time, in the present embodiment, the sliding portion 129 of the second sliding member 125 connected to the moving body 121 is adapted to move along the second axis A2 in the first chute 122 of the moving body 121. Therefore, when the second knob 155 is rotated forward or backward, when the moving body 121 and the lens unit 140 are moved upward or downward relative to the fixing seat 110 along the second axis A2, the second sliding member 125 is not driven by the third sliding member 170.

Based on the above, in the lens module of the projection device of the invention, the lens unit is fixed to the moving assembly, the moving assembly and the first sliding member are movably disposed on the side of the fixing seat, and the second inclined surface of the first sliding member is adjacent to the first inclined surface of the first sliding member. The side surface of the fixing seat is provided with a first guide slot extended along the first axis, and the first fixing member passes through the moving assembly and the first guide slot and is fixed on the fixing seat. The first knob is configured to drive the first sliding member to move relative to the fixing seat. When the first knob is rotated, the first sliding member is driven to move along the second axis, and the second inclined surface pushes against the first inclined surface, so that the moving assembly, together with the lens unit, is moved relative to the fixing seat along the first axis. Therefore, the position of the lens unit of the lens module may be adjusted to improve the quality of the image projected by the projection device. In addition, the lens module has a simple structure and few parts, thus facilitating assembly and effectively saving production and assembly costs.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc., following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens module, comprising:
a fixing seat having a side surface, and the side surface provided with a first guide slot extended along a first axis;
a moving assembly disposed on the side surface of the fixing seat, and the moving assembly comprising a first inclined surface;
a lens unit fixed to the moving assembly;
a first sliding member movably disposed on the side surface of the fixing seat along a second axis and connected to the moving assembly, and the first sliding member comprising a second inclined surface adjacent to the first inclined surface;
a first knob disposed on the fixing seat and connected to the first sliding member, and the first knob configured to drive the first sliding member to move relative to the fixing seat; and
a first fixing member passing through the moving assembly and the first guide slot and fixed on the fixing seat, wherein
when the first knob is rotated, the first sliding member is driven to move along the second axis, and the second inclined surface pushes against the first inclined surface, so that the moving assembly, together with the lens unit, is moved relative to the fixing seat along the first axis.

2. The lens module of claim 1, wherein the moving assembly comprises a moving body and a second sliding member connected to the moving body, the second sliding member comprises a groove, at least a portion of the first sliding member is located in the groove, and the first inclined surface of the groove is adjacent to the second inclined surface of the first sliding member.

3. The lens module of claim 2, wherein the moving body comprises a first chute extended along the second axis, a sliding portion of the second sliding member is located in the first chute, and the sliding portion is adapted to move along the second axis in the first chute.

4. The lens module of claim 1, further comprising an elastic member, wherein the first fixing member comprises a cap portion, a threaded portion, and a connecting portion located between the cap portion and the threaded portion, the moving assembly comprises a moving body, the moving body comprises a first elongated hole extended along the second axis, the connecting portion is located in the first elongated hole, and the elastic member is disposed between the cap portion and the moving body.

5. The lens module of claim 4, further comprising a washer disposed between the elastic member and the moving body.

6. The lens module of claim 1, further comprising a first limiting member disposed on the fixing seat and comprising a first recess hole, wherein the first knob comprises a first handle portion, a first stud, and a first disc located between the first handle portion and the first stud, wherein on a plane perpendicular to the second axis, an area of the first recess hole is greater than a cross-sectional area of the first stud and smaller than an area of the first disc, and the first disc is restricted by the first limiting member from moving on the second axis.

7. The lens module of claim 6, wherein the first sliding member further comprises a first screw hole extended along the second axis, and the first stud of the first knob is screwed to the first screw hole.

8. The lens module of claim 1, further comprising a second fixing member, wherein the first sliding member further comprises a second elongated hole extended along the second axis, and the second fixing member passes through the second elongated hole and is fixed on the side surface of the fixing seat.

9. The lens module of claim 1, further comprising a second knob and a third sliding member linked to the second knob, wherein the second knob is disposed on the fixing seat, the moving assembly comprises a moving body, the moving body comprises a second chute extended along the first axis, the third sliding member is located in the second chute, and when the second knob is rotated, the third sliding member, together with the moving body and the lens unit, is driven to move relative to the fixing seat along the second axis.

10. The lens module of claim 9, wherein the first knob and the second knob are disposed on the fixing seat in parallel along the second axis.

11. The lens module of claim 9, further comprising a second limiting member disposed at the fixing seat and comprising a second recess hole, wherein the second knob comprises a second handle portion, a second stud, and a second disc located between the second handle portion and the second stud, wherein on a plane perpendicular to the second axis, an area of the second recess hole is greater than a cross-sectional area of the second stud and smaller than an area of the second disc, and the second disc is restricted by the second limiting member from moving on the second axis.

12. The lens module of claim 11, wherein the third sliding member comprises a second screw hole extended along the second axis, and the second stud of the second knob is screwed to the second screw hole.

13. The lens module of claim 1, further comprising a protruding member located between the side surface of the fixing seat and the moving assembly, wherein a protruding surface of the protruding member has an arc.

14. A projection device, comprising:

a light source configured to provide an illumination beam;

a light valve disposed on a transmission path of the illumination beam and configured to convert the illumination beam into an image beam; and a lens module disposed on a transmission path of the image beam and configured to project the image beam out of the projection device, wherein the lens module comprises:

a fixing seat having a side surface, and the side surface is provided with a first guide slot extended along a first axis;

a moving assembly disposed on the side surface of the fixing seat, and the moving assembly comprises a first inclined surface;

a lens unit fixed to the moving assembly;

a first sliding member disposed on the side surface of the fixing seat along a second axis and connected to the moving assembly, wherein the first sliding member comprises a second inclined surface adjacent to the first inclined surface;

a first knob disposed on the fixing seat and connected to the first sliding member, wherein the first knob is configured to drive the first sliding member to move relative to the fixing seat; and a first fixing member passing through the moving assembly and the first guide slot and fixed to the fixing seat, wherein when the first knob is rotated, the first sliding member is driven to move along the second axis, and the second inclined surface pushes against the first inclined surface, so that the moving assembly, together with the lens unit, is moved relative to the fixing seat along the first axis.

15. The projection device of claim 14, wherein the moving assembly comprises a moving body and a second sliding member connected to the moving body, the second sliding member comprises a groove, at least a portion of the first sliding member is located in the groove, and the first inclined surface of the groove is adjacent to the second inclined surface of the first sliding member.

16. The projection device of claim 15, wherein the moving body comprises a first chute extended along the second axis, a sliding portion of the second sliding member is located in the first chute, and the sliding portion is adapted to move along the second axis in the first chute.

17. The projection device of claim 14, wherein the lens module further comprises an elastic member, the first fixing member comprises a cap portion, a threaded portion, and a connecting portion located between the cap portion and the threaded portion, the moving assembly comprises a moving body, the moving body comprises a first elongated hole extended along the second axis, the connecting portion is located in the first elongated hole, and the elastic member is disposed between the cap portion and the moving body.

18. The projection device of claim 17, wherein the lens module further comprises a washer disposed between the elastic member and the moving body.

19. The projection device of claim 14, wherein the lens module further comprises a first limiting member disposed at the fixing seat and comprising a first recess hole, and the first knob comprises a first handle portion, a first stud, and a first disc located between the first handle portion and the first stud, wherein on a plane perpendicular to the second axis, an area of the first recess hole is greater than a cross-sectional area of the first stud and smaller than an area of the first disc, and the first disc is restricted by the first limiting member from moving on the second axis.

20. The projection device of claim 19, wherein the first sliding member comprises a first screw hole extended along the second axis, and the first stud of the first knob is screwed to the first screw hole.

21. The projection device of claim 14, wherein the lens module further comprises a second fixing member, the first sliding member comprises a second elongated hole extended along the second axis, and the second fixing member passes through the second elongated hole and is fixed on the side surface of the fixing seat.

22. The projection device of claim 14, wherein the lens module further comprises a second knob and a third sliding member linked to the second knob, the second knob is disposed at the fixing seat, the moving assembly comprises a moving body, the moving body comprises a second chute extended along the first axis, and the third sliding member is located in the second chute, and when the second knob is rotated, the third sliding member, together with the moving body and the lens unit, is driven to move relative to the fixing seat along the second axis.

23. The projection device of claim 22, wherein the first knob and the second knob are disposed on the fixing seat in parallel along the second axis.

24. The projection device of claim 22, wherein the lens module further comprises a second limiting member disposed at the fixing seat and comprising a second recess hole, and the second knob comprises a second handle portion, a second stud, and a second disc located between the second handle portion and the second stud, wherein on a plane perpendicular to the second axis, an area of the second recess hole is greater than a cross-sectional area of the second stud and smaller than an area of the second disc, and the second disc is restricted by the second limiting member from moving on the second axis.

25. The projection device of claim 24, wherein the third sliding member comprises a second screw hole extended along the second axis, and the second stud of the second knob is screwed to the second screw hole.

26. The projection device of claim 14, wherein the lens module further comprises a protruding member located between the side surface of the fixing seat and the moving assembly, and a protruding surface of the protruding member has an arc.

* * * * *